United States Patent [19]
Zinser

[11] Patent Number: 5,842,160
[45] Date of Patent: Nov. 24, 1998

[54] METHOD FOR IMPROVING THE VOICE QUALITY IN LOW-RATE DYNAMIC BIT ALLOCATION SUB-BAND CODING

[75] Inventor: Richard L Zinser, Schenectady, N.Y.

[73] Assignee: Ericsson Inc., Research Triangle Park, N.C.

[21] Appl. No.: 897,022

[22] Filed: Jul. 18, 1997

Related U.S. Application Data

[63] Continuation of Ser. No. 820,733, Jan. 15, 1992, abandoned.

[51] Int. Cl.⁶ .................................................. G10L 00/00
[52] U.S. Cl. ........................ 704/229; 704/205; 704/265
[58] Field of Search ................................... 704/205–209, 704/226–227, 500–504, 265, 229

[56] References Cited

U.S. PATENT DOCUMENTS

| | | | |
|---|---|---|---|
| 4,054,863 | 10/1977 | Goodman et al. | 371/31 |
| 4,156,867 | 5/1979 | Bench et al. | 371/37.7 |
| 4,291,405 | 9/1981 | Jayant et al. | 704/212 |
| 4,375,581 | 3/1983 | Jayant | 375/241 |
| 4,516,258 | 5/1985 | Ching et al. | 704/229 |
| 4,538,234 | 8/1985 | Honda et al. | 704/229 |
| 4,622,680 | 11/1986 | Zinser | 704/205 |
| 4,688,224 | 8/1987 | Dal Degan et al. | 704/233 |
| 4,747,104 | 5/1988 | Piret | 371/38.1 |
| 4,802,171 | 1/1989 | Rasky | 704/211 |
| 4,831,624 | 5/1989 | McLaughlin et al. | 704/229 |
| 4,907,277 | 3/1990 | Callens et al. | 704/202 |
| 4,956,871 | 9/1990 | Swaminathan | 704/229 |
| 5,054,025 | 10/1991 | Galand et al. | 704/226 |
| 5,054,075 | 10/1991 | Hong | 704/226 |
| 5,150,387 | 9/1992 | Yoshikawa et al. | 704/229 |

OTHER PUBLICATIONS

National Conference on Telecommunications, Apr., 1989, London, Choi et al, "Effects of Packet Loss in 3 Toll Quality Speech Coders," pp. 380–385.

*Primary Examiner*—David D. Knepper
*Attorney, Agent, or Firm*—Nixon & Vanderhye P.C.

[57] ABSTRACT

Voice quality is improved in low-rate dynamic bit allocation sub-band coding (DBASC) by inserting synthetic filler signals for non-transmitted signal bands. Large spectral holes may exist in an output voice speech spectrum of DBASC with a low transmission rate. The holes are caused by low energy signal sub-bands that are not transmitted and create noticeable artifacts in the received voice signal. To avoid these artifacts, the spectral holes in the received signal are filled with synthetic signals generated from the received signal. The synthetic filler signals are signals from transmitted energy bands that are scaled to the energy level of the non-transmitted band.

9 Claims, 4 Drawing Sheets

Fig. 1 *PRIOR ART*

METHOD FOR IMPROVING THE VOICE QUALITY IN LOW-RATE DYNAMIC BIT ALLOCATION SUB-BAND CODING

This is a continuation of application Ser. No. 07/820,733, filed Jan. 15, 1992, now abandoned.

FIELD OF THE INVENTION

The present invention generally relates to the transmission of digital signals. In particular, this invention relates to improving signal quality in a low-bit rate multi-band digital transmission.

BACKGROUND AND SUMMARY OF THE INVENTION

Dynamic Bit Allocation Sub-Band Coders (DBASBCs) are often used for coding and digitally transmitting speech signals. DBASBCs operate by dividing incoming digital signals into separate frequency bands. These bands are usually identical in bandwidth such as in the case of a dynamic bit allocation coder. However, the bands may be of different widths.

Splitting the input signal into bands is usually accomplished by digital filters arranged in parallel (1 filter per band) or in a tree structure (a cascaded binary tree of half-band split filters). The outputs of these filters are digitally decimated to reduce their effective sampling rate to the required Nyquist bandwidth before transmission, e.g., two times the filter bandwidth. The decimated sub-band signals are individually coded into bits for transmission. This coding usually takes the form of a scalar (1 dimensional) quantizer.

Sub-band coders achieve positive coding gains by allocating the quantization bits to the individual bands according to the energy level of the signal in each band. Coding gain is the gain in signal-to-noise ratio of a coding algorithm over the signal-to-noise ratio of a scalar quantizer operating at the same transmission (bit) rate. Bands with the highest signal energy levels are assigned the most bits and bands with low energies receive few bits. Of particular importance here is that bands with the lowest signal energy may receive no bits.

The allocation of bits for each band is updated on a periodic basis, since the spectrum of speech signals varies significantly with time. The period of time where the bit allocation is valid (and held constant) is called a frame. Typical frame periods are 10 to 30 milliseconds. All sub-band coder parameters are encoded frame-by-frame.

The energy level of each sub-band is used to compute the correct scaling for the individual band quantizers' step sizes. Because two required pieces of information (the bit allocation and quantizer scaling) are contained in the energy levels, energy levels are transmitted to the receiver as side information. Both the receiver and transmitter use identical algorithms to extract the bit allocation information and quantizer scaling from the energy levels.

The allocation of bits for each band may be performed by using any standard algorithm based on the optimal rate-distortion allocation rule. An explanation of rate-distortion criteria based allocation algorithms is provided in *Digital Coding of Waveforms* by N. S. Jayant and Peter Noll (Prentice-Hall, 1984). A general rule-of-thumb is that a three (3) decibel difference in band energy (or a 6 decibel difference in average amplitude) corresponds to one (1) bit/sub-band sample in allocation.

When a coder is operated at average rates below two (2) bits/sample (16 bits allocated over 8 sub-bands), an allocation algorithm may assign a zero (0) bit allocation to several bands during voiced segments of speech. Any band assigned an allocation of zero (0) bits/sample is not transmitted to the receiver. These non-transmitted bands leave gaps in the spectrum of the digital output speech signal. A standard DBASBC system receiver automatically applies a zero level for bands having zero (0) bit allocation.

The present invention relates to an algorithm for improving the perceptual sound quality of a low transmission rate (DBASBC). With low transmission rates (typically those less than 1.5 bits/sample), the DBASBC algorithm can leave large spectral holes in the output speech spectrum. These gaps are the result of the zonal sampling inherent in the optimal (in the rate-distortion theoretic sense) bit allocation algorithm used in DBASBC. Zonal sampling occurs when the energy level of a given sub-band is below the predicted average distortion level. All bands below this distortion level are allocated zero (0) bits and are not sent to the receiver.

In a DBASBC system, the decimation and upsampling operations can cause significant artifacts in the output speech because of inter-band aliasing. This aliasing can be eliminated by using a filter with a very long impulse response to insure sharp band cutoffs that minimize overlap. Aliasing can also be eliminated by using a quadrature mirror filter (QMF) to cancel any aliasing due to spectral overlap between bands. The second method is preferred because it does not leave small spectral gaps between adjacent bands and can utilize much shorter filters. Because of the anti-aliasing properties, there can be substantial overlap between the frequency responses of the adjacent filters.

Because of the nature of QMFs used in many DBASBC transmitter and receiver filter banks, the absence of bands can cause a noticeable increase in artifacts due to the lack of aliasing cancellation that would have been provided had the non-transmitted bands been present. A method is disclosed here for the receiver to generate synthetic signal material to fill in the non-transmitted bands, thus creating a more natural sounding output.

The disclosed invention fills in the non-transmitted bands without adding ringing artifacts. It does not add appreciably to the complexity of the DBASBC receiver. In addition, it is possible to cancel some of the aliasing between synthetically filled bands by using a tree structured QMF filter bank.

DETAILED DESCRIPTION OF THE DRAWINGS

Figure 1:
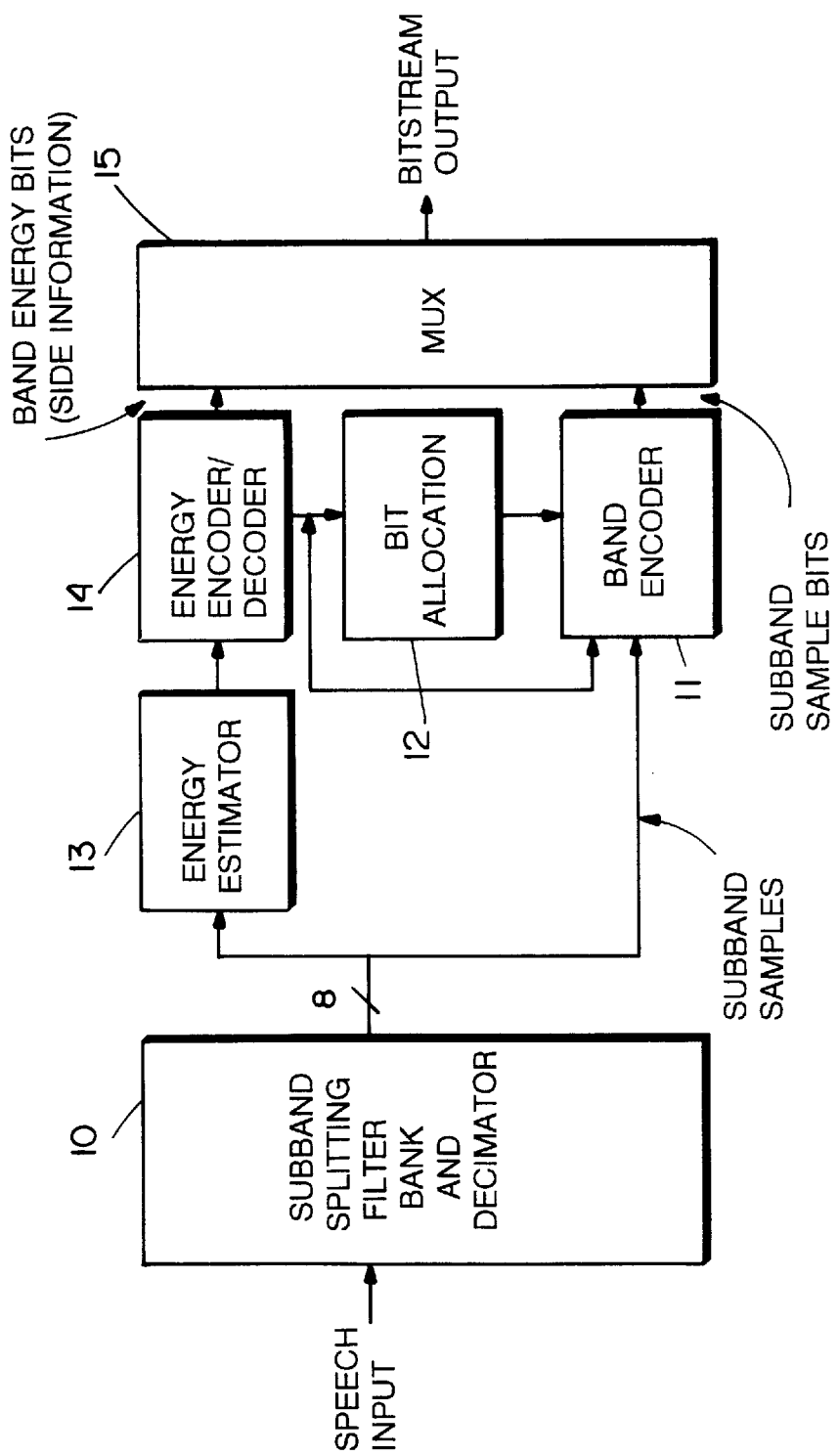
FIG. 1 is a block diagram of a prior art transmitter Dynamic Bit Allocation Sub-Band Coder (DBASBC)

FIG. 1 shows a block diagram of a prior art DBASBC transmitter used in this invention. The incoming digital speech signal is split into eight (8) equal-sized sub-bands by filter bank (10). The energy for each sub-band is calculated by the energy estimator (13). The energies are then passed to the energy encoder/decoder (14), which generally consists of a set of scalar quantizers that are tailored to the long term statistics of each energy level. Encoder (14) provides two output streams: the coded bits representing the energies are sent to multiplexer (15), and the decoded values of the energies are provided to the bit allocation means (12) and to the band encoder (11).

The decoded values of the energy allow the DBASBC receiver and transmitter to track correctly. Bit allocation means (12) allocates the available bits to each band based on the decoded energy level. Band encoder (11) quantizes and encodes the sub-band signals according to the band allocation received from the allocation means (12). The encoder (11) computes the proper quantizer scaling from the decoded energy received from the energy encoder/decoder (14). The quantized sub-band samples and the encoded energy levels are combined in multiplexer (15) for transmission as a bit stream output.

Figure 2:
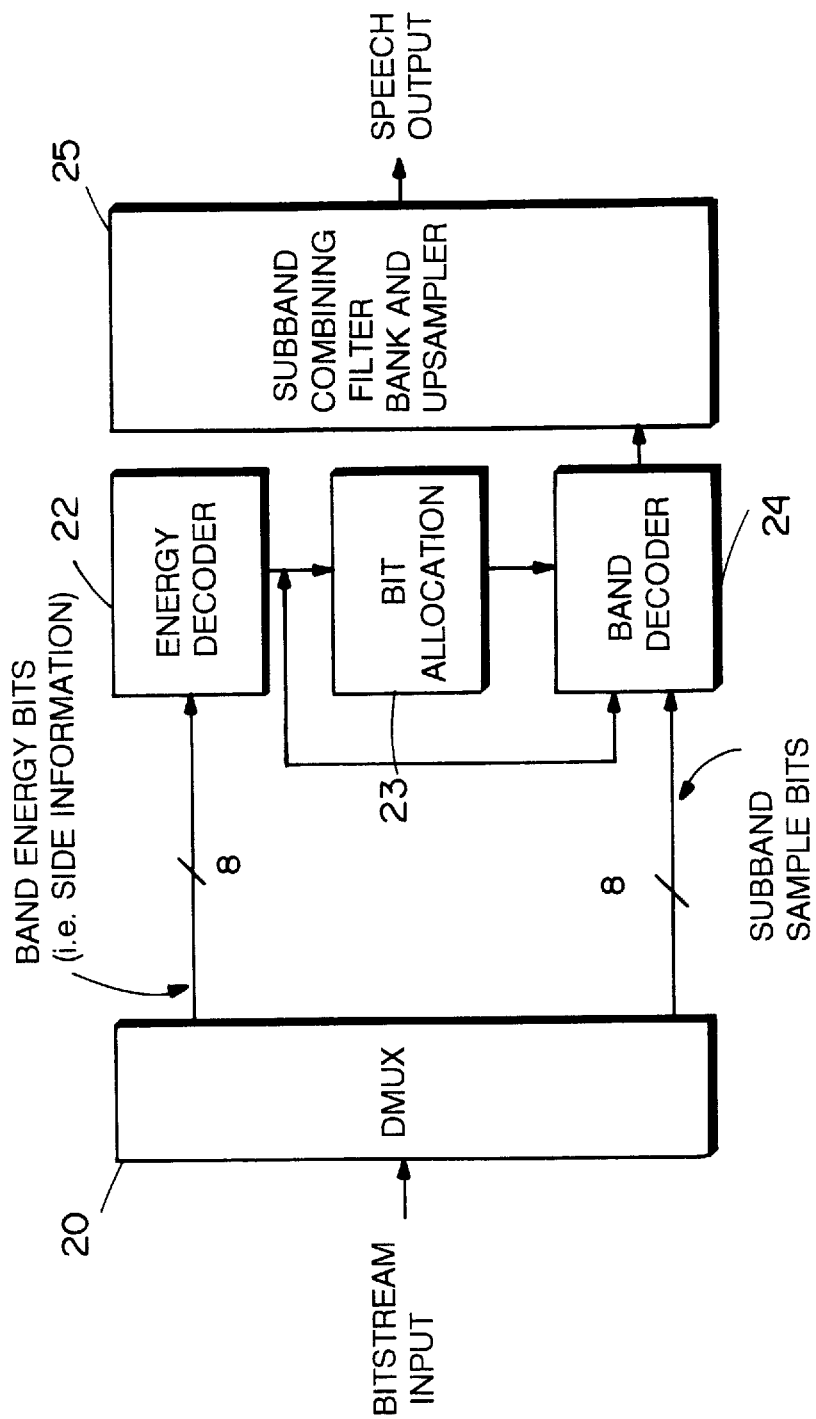
FIG. 2 is a block diagram of a prior art DBASBC receiver.

FIG. 2 shows a block diagram of the receiver. The receiver operation of a DBASBC system is the mirror image of its transmitter. Received bits are unpacked by demultiplexer (20) and separated into bits representing the sub-band energy level and sub-band signal samples. As in the transmitter, the bit allocation means (23) receives the energy level from the decoder (22), and sends the bit allocation to the band decoder (24). Band decoder (24) uses the bit allocation and decoded energy level (from 22) to decode the sub-band samples. The output speech is reconstructed by filter (25) from the decoded sub-band samples.

Figure 3:
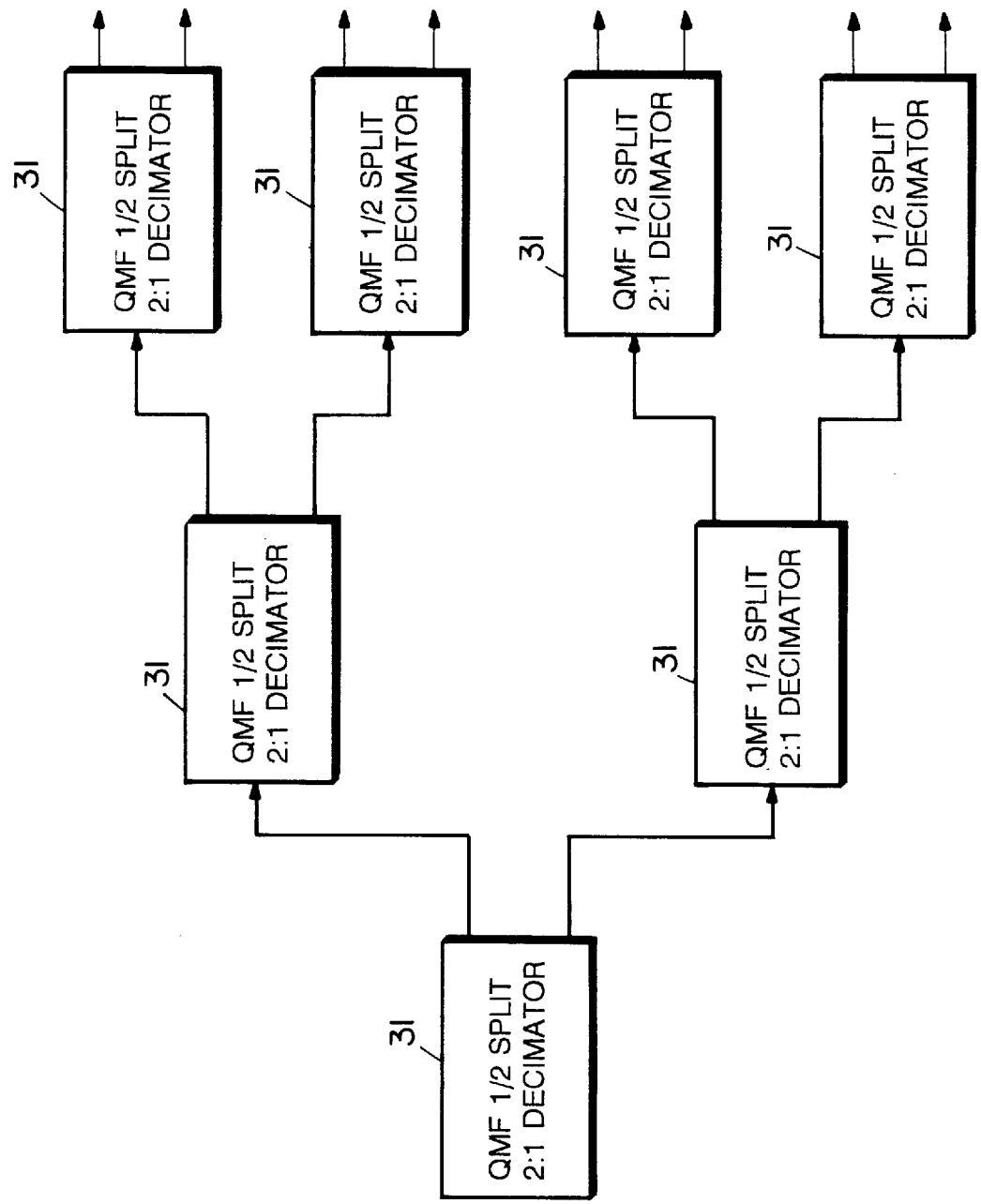
FIG. 3 is a block diagram of a prior art half-split quadrature mirror filter (QMF) tree structure for an eight (8) band sub-band coder (SBC)

FIG. 3 shows an example of a tree structured quadrature mirror filter (QMF) bank for an eight (8) band system. Each splitting filter (31) is composed of mirror image high-pass and low-pass filters that split the incoming signal into two equal bandwidth bands. The 2:1 decimation operation is usually included in the filter structure via a multi-rate transpose of the decimation and filtering operations. The corresponding QMF bank for the receiver is a mirror image of the transmitter bank.

Although the QMF concept has many attractive qualities, it has some serious drawbacks in practical DBASBC applications. The aliasing cancellation is degraded by the sub-band encoding process. Any added quantization noise will be aliased during the unsampling and filter operations in the receiver. This noise is manifested as a rough sound in the bass range and as a metallic ringing in the treble range.

A much larger noise problem occurs when a band is not transmitted due to a zero bit allocation. When zero bit allocation occurs, all aliasing cancellation between a transmitted band and a non-transmitted band is lost. Any signal overlapping from the transmitted band into the non-transmitted band is reflected back into the transmitted band as an alias upon reconstruction by the receiver filter bank. This alias can cause "tonal" artifacts to appear in the output speech. The problem is further exacerbated as bit allocations change from frame to frame. The changing bit allocation generates a "switching" noise that modulates the "tonal" noises.

To reduce noise due to non-transmitted bands, synthetic filler material is substituted for non-transmitted bands. The filler is generated by reusing the signal from a transmitted band. Consider the bands as being numbered from 1 to 8, with 1 corresponding to the lowest frequency band and 8 corresponding to the highest frequency band. To identify the transmitted band to be used as filler material, add or subtract 4 from the band number of the non-transmitted band to be filled. Add 4 if the non-transmitted band is in the range of 1–4 (inclusive). Subtract 4 if the non-transmitted band is in the range of 5–8 (inclusive). For example, if the non-transmitted band is 6, use band 2 as filler. Similarly, if the non-transmitted band is 1, use band 5 as filler.

The principal rationale for using this filling method lies in the long-term statistical average bit allocation for voiced speech. During voiced speech in a low-rate transmission, the allocation algorithm usually places all the bits in the bottom 4 or 5 bands, leaving the top 4 or 3 bands (respectively) with no transmitted signal. Selecting a filler signal that is offset by four (4) bands from the non-transmitted band reasonably ensures that the selected filler band is not also a non-transmitted band.

The other rationale behind using this four (4) band offset scheme is that it produces synthetic filler signals that have no inter-band aliasing. The segment of filter tree structure that splits the top four (4) bands is identical to the segment that splits the bottom four (4) bands. The four (4) band top and bottom "blocks" can be interchanged in the receiver QMF bank and still achieve aliasing cancellation between any bands within the 4 band "block".

Before the filler material can be inserted into the receiver QMF bank, it must be properly scaled. If scaling were not performed, the synthetic material would have too much energy and the filling operation would cause many more artifacts than it mutes. The synthetic fill signal must be scaled so it has an energy level similar to the signal in the band that it is replacing.

The filler signal is normalized by an appropriate quantizer scaling factor dependent on the energy in the filler band. For example, each filler sample is multiplied by the reciprocal of the square root of the normalized energy of the filler band.

The normalized filler signal is multiplied by the quantizer scaling factor for the band to be filled. Thus, the normalized filler signal is rescaled to the signal level in the non-transmitted band. The rescaled filler is further scaled by a constant $\alpha$, where $\alpha$ is fixed as $0.0 < \alpha < 1.0$. An experimentally determined value of 0.5 for the parameter $\alpha$ has given good sound quality.

In symbolic terms, if the signal from band i is being used to produce synthetic filler for band j, then the signal is scaled by the quantity:

$$\alpha g(j)/g(i)$$

where $g(j)$ is the quantizer scaling factor for band j, and $g(i)$ is the quantizer scaling factor for band i. The bands i and j are offset by four (4) bands. This scaling method produces a synthetic fill signal having the same energy as the original (non-transmitted) signal and maintains a proper spectral envelope for the entire multi-band signal.

The scaling operation can limit the aliasing cancellation between synthetically filled bands because the operation may change the relative amplitude of the sub-band signals. In practice, this does not affect the output speech quality.

Figure 4:
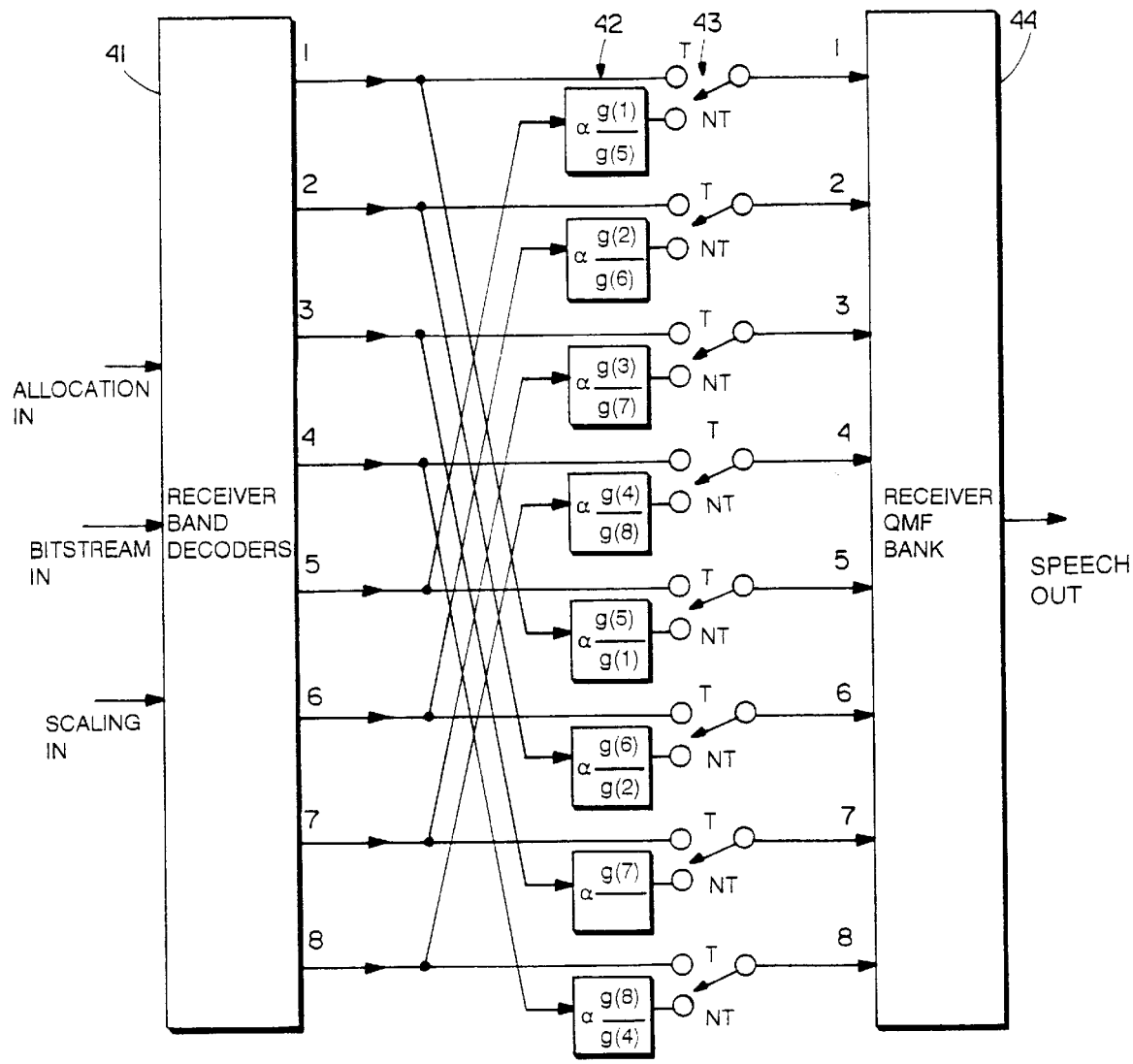
FIG. 4 is a diagram showing the non-transmitted band synthetic fill method of the present invention.

The synthetic fill system is shown in FIG. 4. The system is inserted into the DBASBC receiver between the band decoder (24) and the sub-band combining filter (25). The receiver band decoders (41) use the band bit allocation and quantizer scaling factors to decode the incoming bit stream into the sub-band signal samples.

The eight filter input switches (43) choose the QMF filter input for a given band. If a band is transmitted (T), then the output of the band decoder for the band is fed directly to the corresponding input of the QMF bank (44). If a band is not transmitted (NT), then the appropriate synthetic filler signal is inserted for the band's input on the QMF bank (44).

The eight scaling multipliers (42) apply the proper scaling to the synthetic fill signals. The quantizer scaling factors are proportional to the ratio of the quantizer sealing factors of the zeroed band and of the band to be used as filler.

The system of the present invention was tested in an 8 band DBASBC operating at an average output rate of 1.125 bits/sample (9 bits allocated over 8 bands). Tonal and switching noises were noticeably reduced for many speakers when the synthetic fill system was used. The fill system did not introduce additional "ringing" artifacts.

The invention has been described in connection with what is presently considered to be the most practical and preferred embodiment. The invention is not limited to the disclosed embodiment. Rather, it covers various modifications and equivalent arrangements included within the spirit and scope of the appended claims.

What is claimed is:

1. A method for improving a multi-band signal in a receiver having a sub-frequency band combining filter bank, said method comprising the steps of:
    a. decoding energy levels for each transmitted band of a received signal,
    b. inputting a received sub-band signal sample into the filter bank for each transmitted band;
    c. generating a filler sub-band signal sample for each non-transmitted band of the received signal using at least one but not all received sub-band signal samples from the transmitted bands, where the at least one of the received sub-band signals has a frequency different than does the non-transmitted band, and inputting the filler sub-band signal into the filter bank, and
    d. combining the received sub- band signal samples and the filler sub-band signal sample in the filter bank to form a multi-band signal.

2. A method as in claim 1 wherein the filler sub-band signal of step (c) is a normalized received sub-band signal sample multiplied by a quantizer scaling factor for the non-transmitted band.

3. A method as in claim 2 wherein the generated filler sub-band signal sample is further multiplied by a value of approximately 0.5.

4. A method for improving a multi-band signal in a receiver having a sub-band combining filter bank, said method comprising the steps of:
    a. decoding energy levels for each transmitted band of a received signal,
    b. inputting a received sub-band signal sample into the filter bank for each transmitted band; and
    c. generating a filler sub-band signal sample for each non-transmitted band of the received signal using a received sub-band signal sample from a transmitted band, wherein the transmitted band is offset by four band levels from the corresponding non-transmitted band.

5. A method for improving a low-rate digital signal in a dynamic bit allocation sub-band receiver having quadrature mirror filters, said method comprising the steps of:
    a. separating a received bit stream into bits representing sub-band energy levels and corresponding sub-band signal samples;
    b. allocating bits to each band using the bits from the received bit stream representing sub-band energy levels;
    c. inputting sub-band signal samples into the quadrature mirror filters for each band for which bits are allocated; and
    d. generating a filler signal for a band for which no bits are allocated using a selected sub-band signal sample from a band to which bits are allocated, where the selected sub-band signal is of a frequency sub-band different than a sub-band of the filler signal, and inputting the filler signal to the quadrature mirror filters.

6. A method as in claim 5 wherein in step (d) the filler signal is a signal substantially proportional to the selected sub-band signal sample.

7. A method as in claim 6 wherein the band for the selected signal sample is offset from the band with no allocated bits by a predetermined number of bands.

8. A method for improving a low-rate digital signal in a dynamic bit allocation sub-band receiver having quadrature mirror filters, said method comprising the steps of:
    a. separating a received bit stream into bits representing sub-band energy levels and corresponding sub-band signal samples;
    b. allocating bits to each band of the digital signal using the bits from the received bit stream representing sub-band energy levels;
    c. inputting sub-band received signal samples into the quadrature mirror filters for each band for which bits are allocated; and
    d. generating a sub-band filler signal for a band for which no bits are allocated using a selected sub-band signal sample from a band to which bits are allocated, and inputting the filler signal to the quadrature mirror filters, wherein the filler signal is a signal substantially proportional to the selected sub-band signal sample where the selected sub-band signal sample is multiplied by a quantizer scaling factor for the band having no allocated bits and by the reciprocal of the quantizer scaling factor for the band for the selected signal sample.

9. A method for improving a low-rate digital signal in a dynamic bit allocation sub-band receiver having quadrature mirror filters, said method comprising the steps of:
    a. separating a received bit stream into bits representing sub-band energy levels and corresponding sub-band signal samples;
    b. allocating bits to each band of the digital signal using the bits from the received bit stream representing sub-band energy levels;
    c. inputting sub-band received signal samples into the quadrature mirror filters for each band for which bits are allocated; and
    d. generating a filler sub-band signal for a band for which no bits are allocated using a selected sub-band signal sample from a band to which bits are allocated, and inputting the filler signal to the quadrature mirror filters, wherein the filler signal is a signal substantially proportional to the selected sub-band signal sample and wherein the energy band for the selected signal sample is offset from the band with no allocated bits by four bands.

* * * * *